(12) United States Patent
Shah et al.

(10) Patent No.: US 11,616,457 B2
(45) Date of Patent: Mar. 28, 2023

(54) TORQUE CAPABILITY OPTIMIZATION UNDER ACTIVE LIMITING OF REGENERATIVE CURRENT IN SYNCHRONOUS MOTOR DRIVES

(71) Applicant: Steering Solutions IP Holding Corporation, Saginaw, MI (US)

(72) Inventors: Nakul Shah, Saginaw, MI (US); Prerit Pramod, Saginaw, MI (US); Krishna MPK Namburi, Okemos, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 17/496,226

(22) Filed: Oct. 7, 2021

(65) Prior Publication Data
US 2022/0109386 A1 Apr. 7, 2022

Related U.S. Application Data

(60) Provisional application No. 63/088,581, filed on Oct. 7, 2020.

(51) Int. Cl.
*H02P 6/08* (2016.01)
*H02P 27/08* (2006.01)
*H02P 25/022* (2016.01)

(52) U.S. Cl.
CPC .............. *H02P 6/08* (2013.01); *H02P 25/022* (2013.01); *H02P 27/08* (2013.01); *H02P 2207/05* (2013.01)

(58) Field of Classification Search
CPC ........ H02P 6/08; H02P 2207/05; H02P 27/08; H02P 25/022; H02P 21/00; H02P 21/0003; H02P 21/0021; H02P 21/0089; H02P 21/14; H02P 21/20; H02P 21/22; H02P 21/30; H02P 23/00; H02P 23/06; H02P 23/14; H02P 23/18; H02P 23/30; H02P 25/028; H02P 25/062; H02P 25/064; H02P 25/089; H02P 25/105; H02P 27/00; H02P 27/04; H02P 27/06; H02P 27/12;
(Continued)

(56) References Cited

U.S. PATENT DOCUMENTS

| | | |
|---|---|---|
| 8,896,244 B2 | 11/2014 | Kleinau |
| 10,454,395 B2 | 10/2019 | Li et al. |

(Continued)

*Primary Examiner* — Antony M Paul
(74) *Attorney, Agent, or Firm* — Dickinson Wright PLLC

(57) ABSTRACT

A method of controlling operation of an electric machine includes: determining a voltage-based torque limit based on a voltage constraint of a direct current (DC) bus supplying power to an inverter for powering the electric machine; determining a motor current-based torque limit based on a motor current limit; determining a final torque limit based on the voltage-based torque limit and the motor current-based torque limit; determining a limited command torque based on a torque command and the final torque limit; determining an initial current command corresponding to the inverter satisfying a regenerative current limit of the DC bus; and calculating a final current command based on, at least, the limited command torque and the initial current command. The method includes the final current command exceeding the initial current command to cause the electric machine to produce a torque corresponding to the limited torque command.

20 Claims, 9 Drawing Sheets

(58) Field of Classification Search
CPC .... H02P 2201/03; H02P 2205/05; H02P 1/00; H02P 1/04; H02P 1/423; H02P 3/14
See application file for complete search history.

(56) References Cited

U.S. PATENT DOCUMENTS

| | | |
|---|---|---|
| 10,594,242 B2 * | 3/2020 | Eguchi ................ H02P 21/0089 |
| 2021/0111661 A1 | 4/2021 | Pramod et al. |
| 2021/0152112 A1 | 5/2021 | Li et al. |

\* cited by examiner

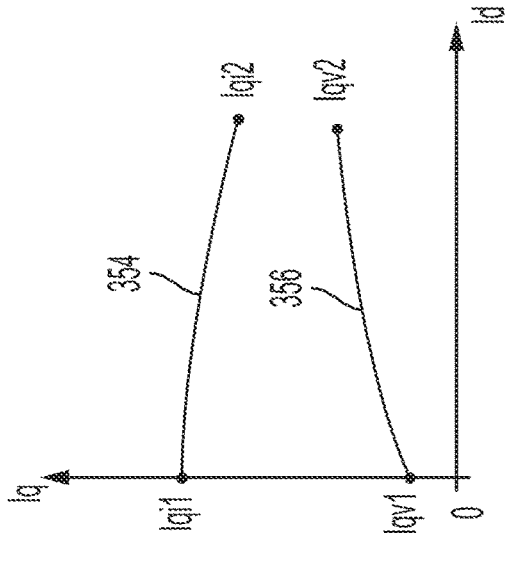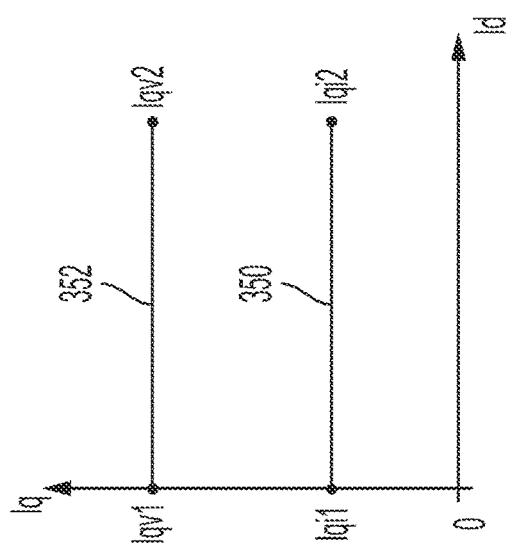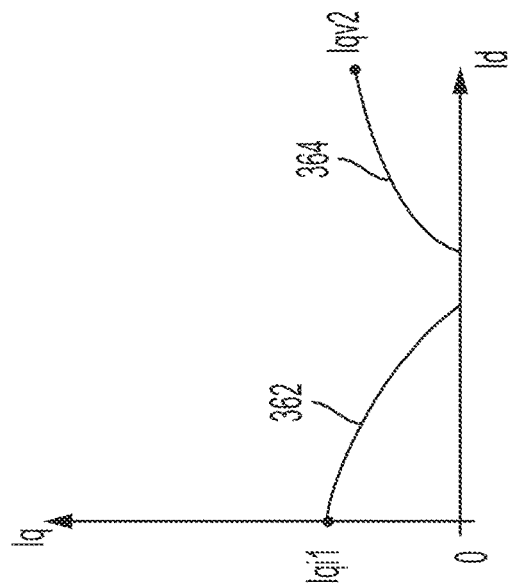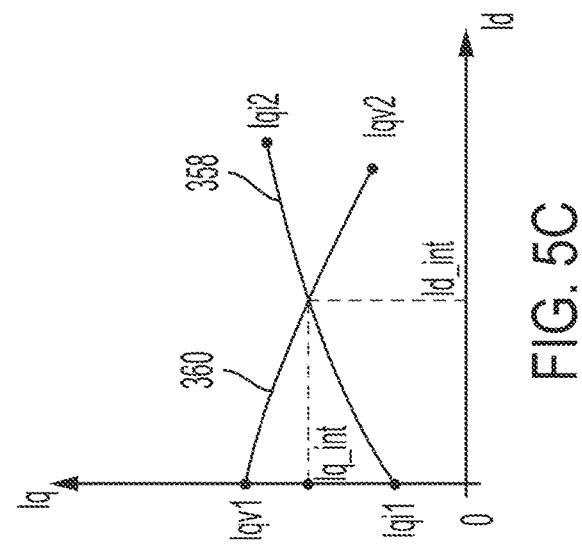

TORQUE CAPABILITY OPTIMIZATION UNDER ACTIVE LIMITING OF REGENERATIVE CURRENT IN SYNCHRONOUS MOTOR DRIVES

CROSS-REFERENCES TO RELATED APPLICATIONS

This patent application claims priority to U.S. Provisional Patent Application Ser. No. 63/088,581, filed Oct. 7, 2020, which is incorporated herein by reference in its entirety.

TECHNICAL FIELD

This disclosure relates to electric machines, and in particular to controlling operation of an electric machine using a motor drive.

BACKGROUND

A vehicle, such as a car, truck, sport utility vehicle, crossover, mini-van, marine craft, aircraft, all-terrain vehicle, recreational vehicle, or other suitable vehicle, typically includes one or more electric machines, such as electric motors and the like. For example, the vehicle may include one or more multiphase electric machines, driven by corresponding motor drives, configured to control various aspects of a steering system of the vehicle.

Power management is an important consideration in controlling electric motor drives to regulate power being delivered to and recovered from an electric motor. Active power management involves consideration of multiple constraints simultaneously to determine achievable torque. Constraints include supply voltage, supply (regenerative) current and inverter (motor) currents. Non-linearities exist in equations representing different constraints necessitating additional algorithms to additionally arbitrate between solutions from two independent constraints.

Constraints to be considered in active power management include: voltage constraints; inverter (motor) current limits; supply and regenerative current limits; and torque command. Such voltage constraints may be based on a physical capability of the machine, including voltage limitations of the inverter, the motor, and/or other components such as interconnection wiring. Voltage constraints may also include capabilities of a power source, such as a battery. Current limits can protect the drive system from damage. Supply and regenerative current limits may include externally imposed constraints (typically for vehicle power management and protection of a battery or a vehicle electrical microgrid). Typically, torque command is independent of constraints and the attempt is to ensure that the limited torque command is as close as possible to the original command.

Prioritization of different constraints may be relatively important for optimal performance of such electric machines. Prioritization of constraints depends significantly on application and use case within which the motor drive is employed.

SUMMARY

This disclosure relates generally to controlling operation of an electric machine using a motor drive.

An aspect of the disclosed embodiments includes a method of controlling operation of an electric machine. The method includes: determining a voltage-based torque limit based on a voltage constraint of a direct current (DC) bus supplying power to an inverter for powering the electric machine; determining a motor current-based torque limit based on a motor current limit; determining a final torque limit based on the voltage-based torque limit and the motor current-based torque limit; determining a limited command torque based on a torque command and the final torque limit; determining an initial current command corresponding to the inverter satisfying a regenerative current limit of the DC bus; and calculating a final current command based on, at least, the limited command torque and the initial current command. The method includes the final current command exceeding the initial current command to cause the electric machine to produce a torque corresponding to the limited torque command.

An aspect of the disclosed embodiments includes a control system for controlling operation of an electric machine. The control system includes a processor and a memory. The memory includes instructions that, when executed by the processor, cause the processor to: determine a voltage-based torque limit based on a voltage constraint of a direct current (DC) bus supplying power to an inverter for powering the electric machine; determine a motor current-based torque limit based on a motor current limit; determine a final torque limit based on the voltage-based torque limit and the motor current-based torque limit; determine a limited command torque based on a torque command and the final torque limit; determine an initial current command corresponding to the inverter satisfying a regenerative current limit of the DC bus; and calculate a final current command based on, at least, the limited command torque and the initial current command. The final current command exceeds the initial current command to cause the electric machine to produce a torque corresponding to the limited torque command.

An aspect of the disclosed embodiments includes a control system for controlling operation of an electric machine. The control system includes an inverter including a plurality of switches operable to supply an alternating current to the electric machine, and a controller. The controller is operable to: determine a voltage-based torque limit based on a voltage constraint of a direct current (DC) bus supplying power to an inverter for powering the electric machine; determine a motor current-based torque limit based on a motor current limit; determine a final torque limit based on the voltage-based torque limit and the motor current-based torque limit; determine a limited command torque based on a torque command and the final torque limit; determine an initial current command corresponding to the inverter satisfying a regenerative current limit of the DC bus; and calculate a final current command based on, at least, the limited command torque and the initial current command. The final current command exceeds the initial current command to cause the electric machine to produce a torque corresponding to the limited torque command.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 5A-5D show graphs generally illustrating four different $I_d, I_q$ trajectories to search for a maximum torque satisfying DC bus voltage and motor current limit constraints, according to the principles of the present disclosure.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable vehicle, typically includes one or more electric machines, such as electric motors and the like. For example, the vehicle may include one or more multiphase electric machines configured to control various aspects of a steering system of the vehicle.

Power management is an important consideration in controlling electric motor drives to regulate power being delivered to and recovered from an electric motor. Active power management involves consideration of multiple constraints simultaneously to determine achievable torque. Constraints include supply voltage, supply (regenerative) current and inverter (motor) currents. Non-linearities exist in equations representing different constraints necessitating additional algorithms to additionally arbitrate between solutions from two independent constraints.

Constraints to be considered in active power management include: voltage constraints; inverter (motor) current limits; supply and regenerative current limits; and torque command. Such voltage constraints may be based on a physical capability of the machine, including voltage limitations of the inverter, the motor, and/or other components such as interconnection wiring. Voltage constraints may also include capabilities of a power source, such as a battery. Current limits can protect the drive system from damage. Supply and regenerative current limits may include externally imposed constraints (typically for vehicle power management and protection of a battery or a vehicle electrical microgrid). Typically, torque command is independent of constraints and the attempt is to ensure that the limited torque command is as close as possible to the original command.

Prioritization of different constraints may be relatively important for optimal performance of such electric machines. Prioritization of constraints depends significantly on application and use case within which the motor drive is employed.

According to an aspect of the disclosure, a plurality of different constraints are considered simultaneously, and torque maximization is prioritized over meeting a regenerative current constraint.

Figure 1:
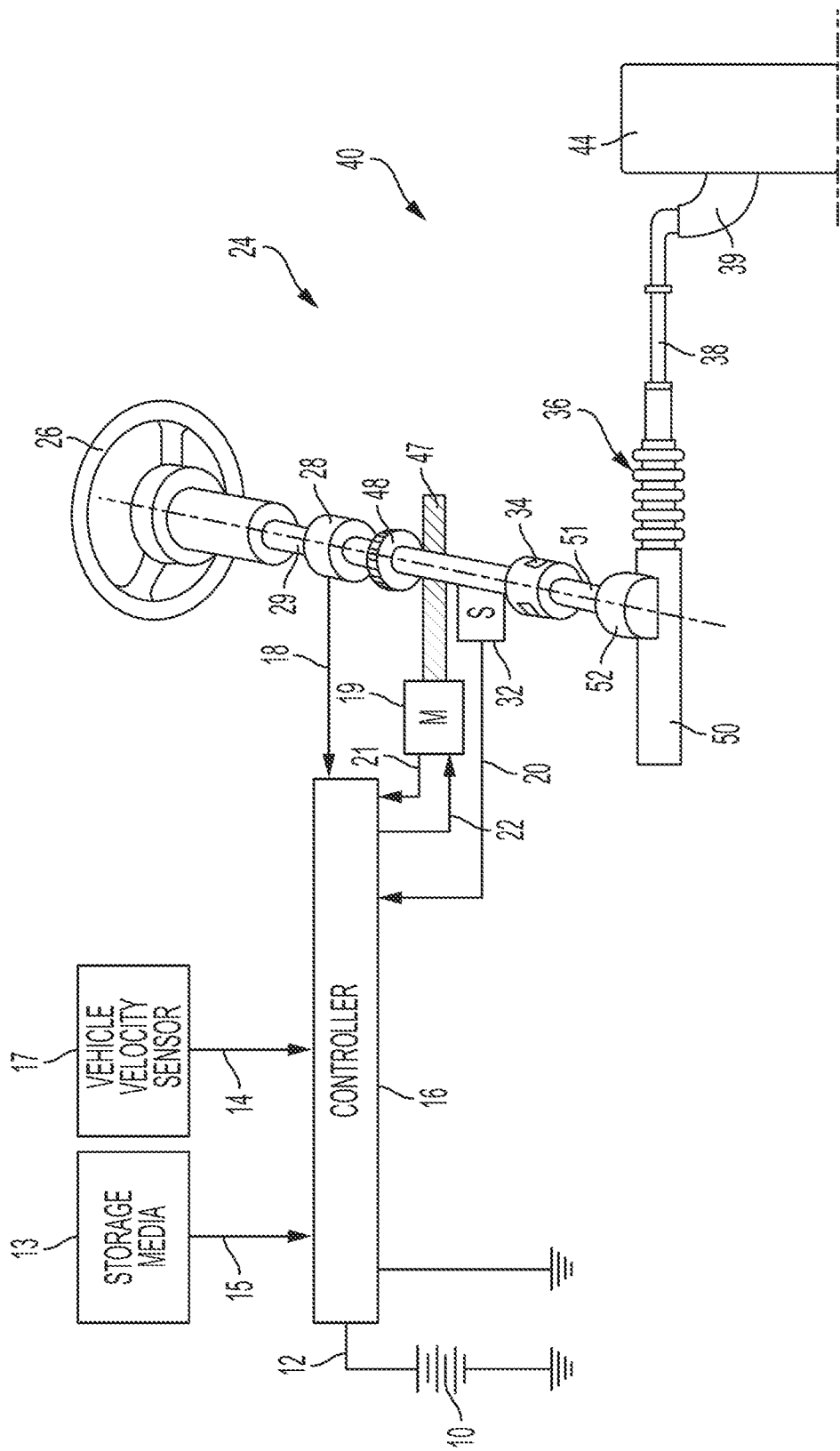
FIG. 1 generally illustrates a schematic diagram of an electric power steering system according to the principles of the present disclosure.

FIG. 1 generally illustrates a schematic diagram of an electric power steering system (EPS) 40 suitable for implementation of the disclosed techniques. The EPS includes a steering mechanism 36, which includes a rack-and-pinion type mechanism having a toothed rack (not shown) within housing 50 and a pinion gear (also not shown) located under gear housing 52. As the operator input, hereinafter denoted as a steering wheel 26 (e.g. a hand wheel and the like), is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through a control system 24, which includes the controller 16 and a motor 19, which may be a permanent magnet synchronous motor (PMSM). The controller 16 is powered by the vehicle power supply 10 through line 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a velocity signal 21. A motor velocity denoted $\omega_m$ may be measured, calculated or a combination thereof. For example, the motor velocity $\omega_m$ may be calculated as the change of the motor position $\theta$ as measured by a position sensor 32 over a prescribed time interval. For example, motor speed $\omega_m$ may be determined as the derivative of the motor position $\theta$ from the equation $\omega_m = \Delta\theta/\Delta t$ where $\Delta t$ is the sampling time and $\Delta\theta$ is the change in position during the sampling interval. Alternatively, motor velocity may be derived from motor position as the rate of change of position with respect to time. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the motor 19, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, hereafter, for brevity and simplicity, reference will be made to motors only without limitation.

In the control system 24 as depicted, the controller 16 utilizes the torque, position, and speed, and like, to compute a command(s) to deliver the required output power. controller 16 is disposed in communication with the various systems and sensors of the motor control system. controller 16 receives signals from each of the system sensors, quantifies the received information, and provides an output command signal(s) in response thereto, in this instance, for example, to the motor 19. controller 16 is configured to develop the corresponding voltage(s) out of inverter (not shown), which may optionally be incorporated with controller 16 and will be referred to herein as controller 16, such that, when applied to the motor 19, the desired torque or position is generated. In one or more examples, the controller 16 operates in a feedback control mode, as a current regulator, to generate the command 22. Alternatively, in one or more examples, the controller 16 operates in a feedforward control mode to generate the command 22. Because these voltages are related to the position and speed of the motor 19 and the desired torque, the position and/or speed of the rotor and the torque applied by an operator are determined. A position encoder is connected to the steering shaft 51 to detect the angular position θ. The encoder may sense the rotary position based on optical detection, magnetic field variations, or other methodologies. Typical position sensors include potentiometers, resolvers, synchros, encoders, and the like. The position encoder outputs a position signal 20 indicating the angular position of the steering shaft 51 and thereby, that of the motor 19.

Desired torque may be determined by one or more torque sensors 28 transmitting torque signals 18 indicative of an applied torque. Such a torque sensor 28 and the torque signal(s) 18 therefrom, as may be responsive to a compliant torsion bar, T-bar, spring, or similar apparatus (not shown) configured to provide a response indicative of the torque applied.

The position signal 20, velocity signal 21, and a torque signal(s) 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces.

Figure 2:
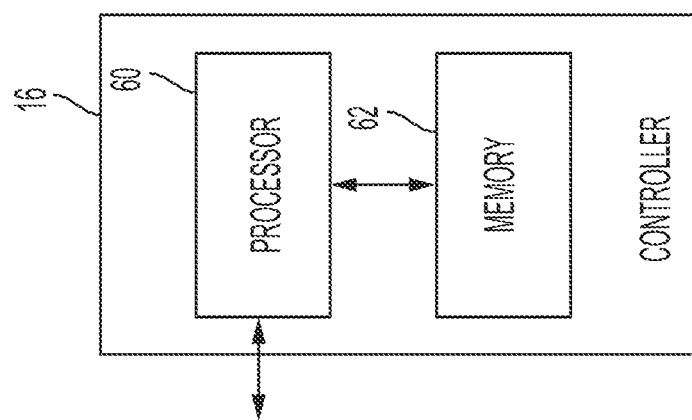
FIG. 2 generally illustrates a controller according to the principles of the present disclosure.

As is generally illustrated in FIG. 2, the controller 16 may include any suitable controller. The controller 16 may be configured to control, for example, various aspects of a vehicle, such as aspect of an electronic power steering system and/or other suitable features or components of the vehicle. The controller 16 may include a processor 60 and a memory 62.

The processor 60 may include any suitable processor, such as those described herein. Additionally, or alternatively, the controller 16 may include any suitable number of processors, in addition to or other than the processor 60. The memory 62 may comprise a single disk or a plurality of disks (e.g., hard drives), and includes a storage management module that manages one or more partitions within the memory 62. In some embodiments, memory 62 may include flash memory, semiconductor (solid state) memory or the like. The memory 62 may include Random Access Memory (RAM), a Read-Only Memory (ROM), or a combination thereof. The memory 62 may include instructions that, when executed by the processor 60, cause the processor 60 to, at least, control various functions of the vehicle.

Figure 3:
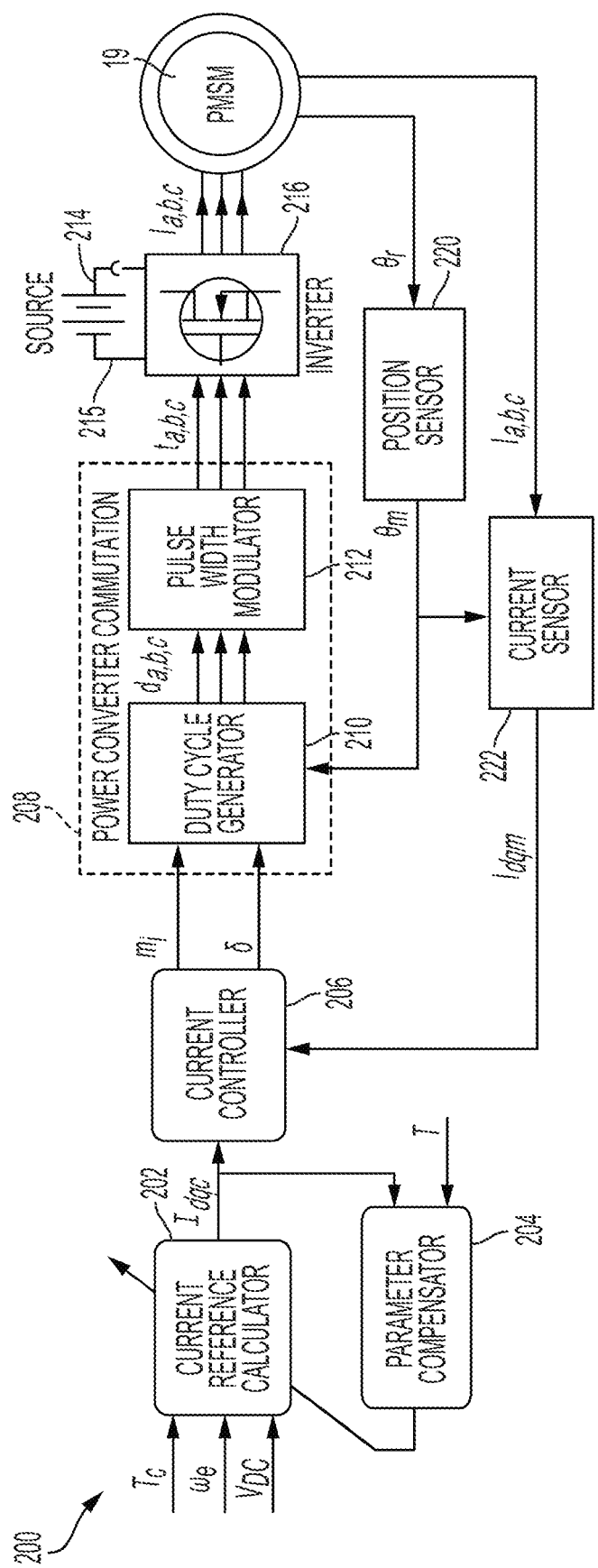
FIG. 3 generally illustrates a block diagram of an electric machine controller according to the principles of the present disclosure.

In some embodiments, the controller 16 may be configured to control various aspects of an electric machine, such as the motor control system 200, as is generally illustrated in FIG. 3. In some embodiments, as is generally illustrated, the motor control system 200 may include a three-phase PMSM controller. However, the motor control system 200 may include any suitable number of phases. Additionally, or alternatively, while the motor control system 200 is generally illustrated and described as being associated with a vehicle and the systems thereof, the motor control system 200 may be configured to control or be operatively associated with any suitable application in addition to or besides the vehicle (e.g., the motor 19 may be used in any suitable application other than a vehicle, and the principles of the present disclosure may apply accordingly).

The present disclosure provides a motor control system 200 for controlling operation of an electric machine, such as the motor 19. However, the principles of the present disclosure may be applied to controlling other types of synchronous machines. The principles of the present disclosure may be used for controlling a salient pole electric machine and/or a non-salient pole electric machine. The principles of the present disclosure may be used for controlling a wound rotor synchronous machine.

The current reference calculator 202 converts the torque command $T_c$ into d/q current references $I_{dpc}$, which are then sent to the current controller 206. The current controller 206 may be a feedback regulator utilizing current measurements or a feedforward compensator. The temperature T can be fed into a parameter compensator 204 to adjust the PMSM electrical parameters as necessary. The current controller 206 then generates the d/q voltage command, which are equivalent to a commanded modulation index $m_i$ and phase advance angle δ. The $m_i$ and δ are converted to an equivalent duty cycle signal $d_a$, $d_b$, $d_c$ for each of three phases a, b, c, respectively, by the duty cycle generator 210 of the power converter commutation module 208.

Once the equivalent duty cycle signals $d_a$, $d_b$, $d_c$ for each phase are generated, the pulse width modulator 212 then generates corresponding on-times $t_a$, $t_b$, $t_c$ for the different switches (e.g., FETs) in the phase legs of the power converter (e.g., the inverter 216). The duty cycle signals $d_a$, $d_b$, $d_c$ may be labeled $d_{a,b,c}$ collectively, and the on-times $t_a$, $t_b$, $t_c$, may be labeled $t_{a,b,c}$ collectively. The inverter 216, powered by a source 214, then supplies the desired voltages to an electric machine (e.g., the motor 19), which produces phase currents $I_a$, $I_b$, $I_c$, and electromagnetic torque $T_e$. The inverter 216 is connected to the source 214 via a direct current (DC) bus 215. The position Or and phase currents $I_a$, $I_b$, $I_c$, are then measured and fed back to the position sensor 220 and the current sensor 222, respectively, of the control system to close the control loop. The phase currents $I_a$, $I_b$, $I_c$, may be labeled $I_{a,b,c}$ collectively. The measured position $\theta_m$ is used with the phase currents to compute the d/q measured currents $I_{dpm}$ which are utilized for closed-loop current control. A voltage source inverter (VSI) is typically employed as the power converter in PMSM based electric drives. Each of the phases of the motor 19 is connected to a corresponding phase leg of the inverter 216, and each of the phase legs may have two or more switches.

While the design and structure of the actual machine are different for three phase and multiphase (greater than three phases) PMSMs, the same principle of vector control in the synchronous or d/q reference frame is possible for all these machines by using the appropriate transformation matrices for converting phase currents and voltages into the equivalent DC quantities in the synchronous frame.

Figure 4:
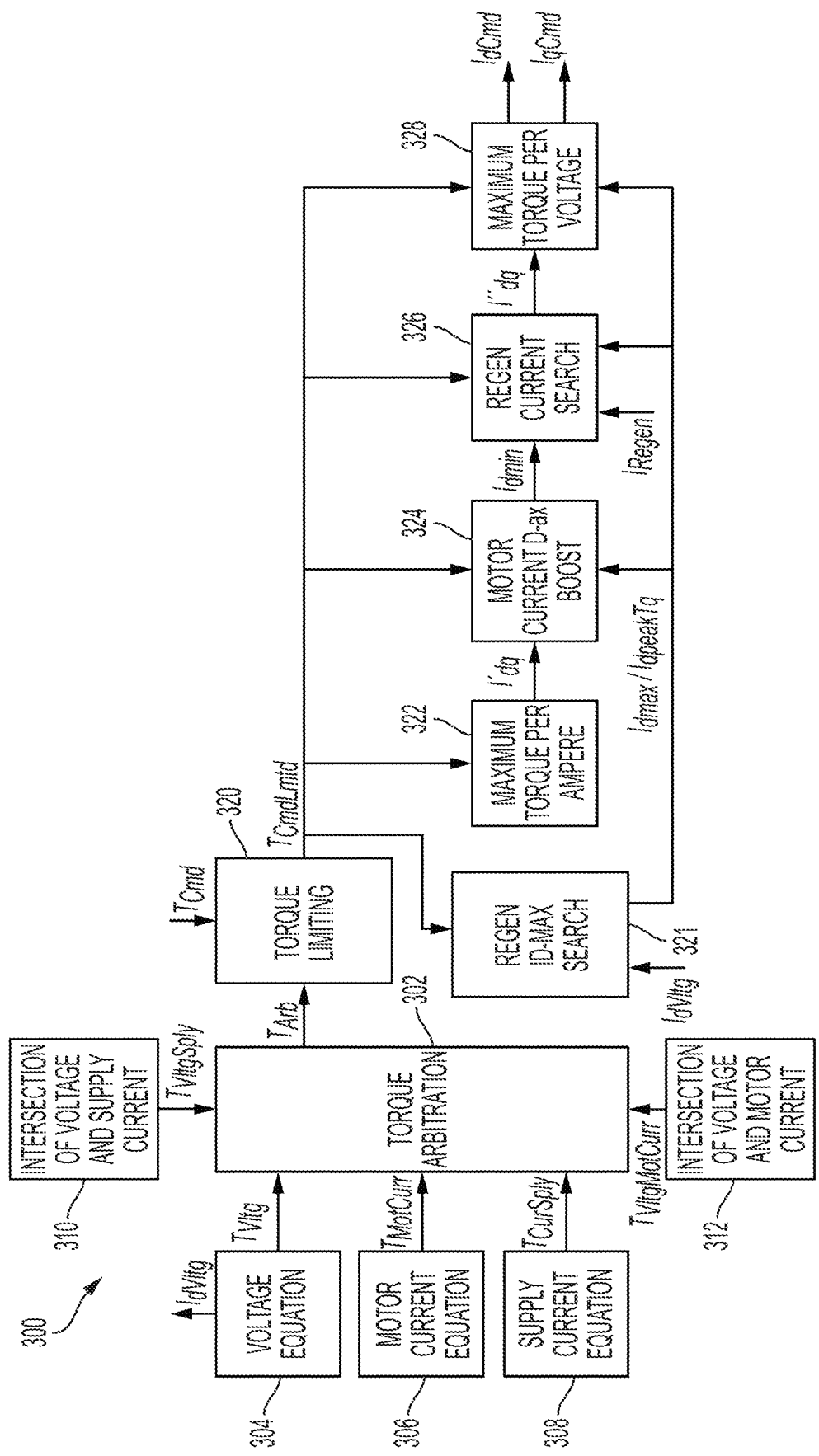
FIG. 4 generally illustrates a block diagram of an example algorithm for controlling an electric machine according to aspects of the present disclosure.

FIG. 4 generally illustrates a block diagram of an example algorithm 300 for controlling an electric machine according to aspects of the present disclosure. Specifically, the example algorithm 300 includes a torque arbitration block 302 configured to determine an arbitrated torque limit $T_{Arb}$ based on several inputs, which may include one or more of: a voltage-based torque limit $T_{Vltg}$; a motor current-based torque limit $T_{MotCurr}$; a supply current-based torque limit $T_{CurSply}$; a voltage and supply current-based torque limit $T_{VltgSply}$; and a voltage and motor current-based torque limit $T_{VltgMotCurr}$.

The example algorithm 300 includes a voltage-based torque block 304 configured to determine a voltage-based torque limit $T_{Vltg}$ based on a voltage constraint VDC of the DC bus 215. The voltage constraint VDC may include a highest voltage that the DC bus 215 is rated to operate. Alternatively or additionally, the voltage constraint VDC may include a voltage that the DC bus 215 is rated to operate. Operation of the DC bus 215 with a voltage outside of the voltage constraint VDC may have adverse results, such as equipment failure and/or damage to hardware connected to the DC bus 215. In some embodiments, the voltage-based torque block 304 may use equation (1), below, also called the voltage equation, for determining either or both of the voltage-based torque limit $T_{Vltg}$ and/or the voltage-based direct-axis current $I_{dVltg}$.

$$V_d^2 + V_q^2 \leq V_{DC}^2 \tag{1}$$

The example algorithm 300 includes a motor current-based torque block 306 configured to determine the motor current-based torque limit $T_{MotCurr}$ corresponding to the motor current $I_m$ supplied by the inverter 216 to the motor 19 satisfying a motor current limit $I_i^{lim}$. The motor current limit $I_i^{lim}$ may include a current limit of the motor 19 and/or a current limit of the inverter 216. The motor current limit $I_i^{lim}$ may be a smaller one of a current limit of the motor 19 and a current limit of the inverter 216. In some embodiments, motor current-based torque block 306 may use equation (2), below, also called the motor current equation, for determining the motor current-based torque limit $T_{MotCurr}$.

$$I_d^2 + I_q^2 \leq I_i^{lim2} \tag{2}$$

The example algorithm 300 includes a supply current-based torque block 308 configured to determine the supply current-based torque limit $T_{CurSply}$ corresponding to a supply current $I_s$ supplied from the DC bus 215 to the inverter 216 satisfying a supply current limit $I_{slim}$. In some embodiments, the supply current-based torque block 308 may use equation (3), below, also called the power equation, for determining the supply current-based torque limit $T_{CurSply}$.

$$\frac{\sqrt{3}}{2}(V_d I_d + V_q I_q) \leq V_{dc} I_s - I_s^2 R_{dc} \tag{3}$$

where $V_d$ and $I_d$ are d-axis voltage and current, respectively, $V_q$ and $I_q$ are q-axis voltage and current, respectively, $V_{dc}$ is the bus voltage of the DC bus 215, $I_s$ is the supply current supplied from the DC bus 215 to the inverter 216, and $R_{dc}$ is the effective resistance of the DC bus 215.

The example algorithm 300 also includes a voltage and supply current-based torque block 310 configured to determine the voltage and supply current-based torque limit $T_{VltgSply}$ to satisfy the voltage constraint VDC of the DC bus 215, and with the supply current $I_s$ supplied from the DC bus 215 to the inverter 216 satisfying the supply current limit $I_{slim}$. In some embodiments, the voltage and supply current-based torque block 310 may determine the voltage and supply current-based torque limit $T_{VltgSply}$ based on an intersection of d-axis and q-axis currents to satisfy each of the voltage constraint VDC of the DC bus 215 and the supply current limit $I_{slim}$.

The example algorithm 300 also includes a voltage and motor current-based torque block 312 configured to determine the voltage and motor current-based torque limit $T_{VltgMotCurr}$ to satisfy the voltage constraint VDC of the DC bus 215, and with the motor current $I_m$ between inverter 216 and the motor 19 satisfying the motor current limit $I_i^{lim}$. In some embodiments, the voltage and motor current-based torque block 312 may determine the voltage and motor current-based torque limit $T_{VltgMotCurr}$ based on an intersection of d-axis and q-axis currents to satisfy each of the D voltage constraint $V_{DC}$ of the DC bus 215 and the motor current limit $I_i^{lim}$.

The example algorithm 300 also includes a torque limiting block 320, which determines a limited command torque $T_{CmdLmtd}$ based on a commanded torque $T_{Cmd}$ and the arbitrated torque limit $T_{Arb}$ from the torque arbitration block 302. The torque limiting block 320 may be configured to set the limited command torque $T_{CmdLmtd}$ to a lesser of the commanded torque $T_{Cmd}$ and the arbitrated torque limit $T_{Arb}$.

The example algorithm 300 also includes a regen. maximum d-axis current search block 321 configured to determine a maximum d-axis current $I_{dmax}$ and a d-axis current to produce peak torque $I_{dpeakTq}$, which each satisfy requirements for regenerative current. The regen. maximum d-axis current search block 321 may use the limited command torque $T_{CmdLmtd}$ to determine one or both of the maximum d-axis current $I_{dmax}$ and/or the d-axis current to produce peak torque $I_{dpeakTq}$, which each satisfy requirements for regenerative current. The requirements for regenerative current may include a regenerative current limit $I_{Regen}$, which is a largest amount of current that the DC bus 215 is capable of receiving from the inverter 216. Exceeding the regenerative current limit $I_{Regen}$ may cause problems, such as overcharging a battery connected to the DC bus 215.

In some embodiments, the regen. maximum d-axis current search block 321 may use equation (4), below, also called the power equation, for determining either or both of the maximum d-axis current $I_{dmax}$ and/or the d-axis current to produce peak torque $I_{dpeakTq}$, which each satisfy requirements for regenerative current.

$$\frac{\sqrt{3}}{2}(V_d I_d + V_q I_q) \geq V_{dc} I_r - I_r^2 R_{dc} \quad (4)$$

where $I_r$ is the regenerative current supplied from the inverter 216 to the DC bus 215. The regenerative current $I_r$ is an inverse of the supply current $I_s$.

The example algorithm 300 also includes a maximum torque per ampere block 322, which may determine preliminary motor current values $I'_{dq}$ based on the limited command torque $T_{CmdLmtd}$. The preliminary motor current values $I'_{dq}$ may be optimized based on a maximum torque per ampere determination, which may include performing one or more calculations and/or other methods. The optimized motor current values $I'_{dq}$ may include a preliminary d-axis current I'd and a preliminary q-axis current I'q.

The example algorithm 300 also includes a d-axis current boost block 324, which may be configured to determine a minimum d-axis current $I_{dmin}$ based on one or more of: the preliminary motor current values $I'_{dq}$, the limited command torque $T_{CmdLmtd}$, the maximum d-axis current $I_{dmax}$, and/or the d-axis current to produce peak torque $I_{dpeakTq}$.

The example algorithm 300 also includes a regen. current search block 326, which may be configured to determine a modified motor current I"dq including a modified d-axis current I"$_d$ and a modified q-axis current I"q, which correspond to the inverter 216 satisfying the regenerative current limit $I_{Regen}$ of the DC bus 215. The regen. current search block 326 may determine the modified motor current I"dq based on one or more of: the minimum d-axis current $I_{dmin}$, the regenerative current limit $I_{Regen}$, the limited command torque $T_{CmdLmtd}$, the maximum d-axis current $I_{dmax}$, and/or the d-axis current to produce peak torque $I_{dpeakTq}$.

The example algorithm 300 also includes a maximum torque per voltage block 328, which may be configured to determine a d-axis current command $I_{dCmd}$ and a q-axis current command $I_{qCmd}$ may cause the motor 19 to produce a maximum torque which also satisfies the limited command torque $T_{CmdLmtd}$. The maximum torque per voltage block 328 may determine the d-axis current command $I_{dCmd}$ and/or the q-axis current command $I_{qCmd}$ based on one or more of: modified motor current I"dq, the limited command torque $T_{CmdLmtd}$, the maximum d-axis current $I_{dmax}$, and/or the d-axis current to produce peak torque $I_{dpeakTq}$.

FIGS. 5A-5D show graphs generally illustrating four different $I_d, I_q$ trajectories to search for a maximum torque for satisfying DC bus voltage and motor current limit constraints, VDC and $I_i^{lim}$, respectively, according to the principles of the present disclosure.

Specifically, FIG. 5A includes a first plot 350 showing d-axis current and q-axis current $I_d, I_q$ calculated to satisfy the motor current limit $I_i^{lim}$. The first plot 350 extends between a first motor current-based q-axis current ha where the d-axis current $I_d$ is equal to a predetermined minimum value, and a second motor current-based q-axis current 42 where the d-axis current $I_d$ is equal to a predetermined maximum value. The predetermined minimum value may be, for example, zero or a positive or negative value that is less than the predetermined maximum value. FIG. 5A also includes a second plot 352 showing d-axis current and q-axis current $I_d, I_q$ calculated to satisfy the voltage constraint $V_{DC}$ of the DC bus 215. The second plot 352 extends between a first voltage limit-based q-axis current $I_{qv1}$ where the d-axis current $I_d$ is equal to the predetermined minimum value, and a second voltage limit-based q-axis current $I_{qv2}$ where the d-axis current $I_d$ is equal to the predetermined maximum value.

FIG. 5A illustrates a case in which the plots 350, 352 both have positive q-axis current $I_q$ values for all d-axis current $I_d$ values, and where the first plot 350 always has a q-axis current $I_q$ value that is lower than the corresponding q-axis current $I_q$ value of the second plot 352. Thus, in this case, the voltage and motor current-based torque block 312 may set the voltage and motor current-based torque limit $T_{VltgMotCurr}$ equal to the motor current-based torque limit $T_i^{pk}$.

FIG. 5B includes a first plot 354 showing d-axis current and q-axis current $I_d, I_q$ calculated to satisfy the motor current limit $I_i^{lim}$. The first plot 354 extends between a first motor current-based q-axis current $I_{qi1}$ where the d-axis current $I_d$ is equal to the predetermined minimum value, and a second motor current-based q-axis current 42 where the d-axis current $I_d$ is equal to a predetermined maximum value. FIG. 5B also includes a second plot 356 showing d-axis current and q-axis current $I_d, I_q$ calculated to satisfy the voltage constraint $V_{DC}$ of the DC bus 215. The second plot 356 extends between a first voltage limit-based q-axis current $I_{qv1}$ where the d-axis current $I_d$ is equal to the predetermined minimum value, and a second voltage limit-based q-axis current $I_{qi2}$ where the d-axis current $I_d$ is equal to the predetermined maximum value.

FIG. 5B illustrates a case in which the plots 354, 356 both have positive q-axis current $I_q$ values for all d-axis current $I_d$ values, and where the second plot 356 always has a q-axis current $I_q$ value that is lower than the corresponding q-axis current $I_q$ value of the first plot 354. Thus, in this case, the voltage and motor current-based torque block 312 may set the voltage and motor current-based torque limit $T_{VltgMotCurr}$ equal to the voltage-based torque limit $T_{Vltg}$.

FIG. 5C includes a first plot 358 showing d-axis current and q-axis current $I_d, I_q$ calculated to satisfy the motor current limit $I_i^{lim}$. The first plot 358 extends between a first motor current-based q-axis current $I_{qi1}$ where the d-axis current $I_d$ is equal to the predetermined minimum value, and a second motor current-based q-axis current 42 where the d-axis current $I_d$ is equal to a predetermined maximum value. FIG. 5C also includes a second plot 360 showing d-axis current and q-axis current $I_d, I_q$ calculated to satisfy the voltage constraint $V_{DC}$ of the DC bus 215. The second plot 360 extends between a first voltage limit-based q-axis current $I_{qv1}$ where the d-axis current $I_d$ is equal to the predetermined minimum value, and a second voltage limit-based q-axis current $I_{qv2}$ where the d-axis current $I_d$ is equal to the predetermined maximum value.

FIG. 5C illustrates a case in which the plots 358, 360 intersect each other in the illustrated region (positive values of both $I_d, I_q$). So, in the case where the current based curve and voltage based curve are intersecting, the final torque limit $T_{pk}$ should be determined based on the intersection point of the curves represented by the plots 358, 360. For example, the controller 16 may determine a d-axis intersection current value $I_{d\_int}$ where a q-axis current corresponding to the motor current limit $I_i^{lim}$ is equal to a q-axis current corresponding to the voltage constraint $V_{DC}$ of the DC bus 215 (i.e. where plots 358, 360 intersect). The controller 16 may determine the final torque limit $T_{pk}$ based on the d-axis intersection current value $I_d$ int. For example, the controller 16 may determine a corresponding q-axis intersection current value $I_{q\_int}$ that satisfies both a voltage equation for satisfying the voltage constraint $V_{DC}$ of the DC bus 215, and a current equation for satisfying the motor current limit $I_i^{lim}$. The voltage equation may include equation (1), above; and the current equation may include equation (2), above. This corresponding q-axis intersection current value $I_q$ int is shown graphically on FIG. 5C. The controller 16 may then determine the final torque limit $T_{pk}$ based on the d-axis intersection current value $I_{d\_int}$ and the q-axis intersection current value $I_{q\_int}$. For example, the controller 16 may calculate the final torque limit $T_{pk}$ by plugging-in the d-axis intersection current value $I_{d\_int}$ and the q-axis intersection current value $I_{q\_int}$ to a torque equation for computing a torque based on d-axis and q-axis currents. The torque equation may include equation (5), below.

$$T_e = \frac{3}{2}K_e I_q + \frac{3}{4}N_p(L_q - L_d)I_d I_q \quad (5)$$

where $T_e$ is a torque produced by the motor 19, $K_e$ is a motor voltage constant, $N_p$ is a number of poles of the motor 19, $L_d$ and $L_q$ are d-axis and q-axis inductances of the motor 19, respectively, and $I_d$ and $I_q$ are the d-axis and q-axis currents, respectively.

FIG. 5D includes a first plot 362 showing d-axis current and q-axis current $I_d, I_q$ calculated to satisfy the motor current limit $I_i^{lim}$. The first plot 362 extends between a first motor current-based q-axis current $I_{qi1}$ where the d-axis current $I_d$ is equal to the predetermined minimum value, and a second, negative, motor current-based q-axis current where the d-axis current $I_d$ is equal to the predetermined maximum value (not shown on the graph). FIG. 5D also includes a second plot 364 showing d-axis current and q-axis current $I_d, I_q$ calculated to satisfy the voltage constraint $V_{DC}$ of the DC bus 215. The second plot 364 extends between a first voltage limit-based q-axis current where the d-axis current $I_d$ is equal to the predetermined minimum value, and a second voltage limit-based q-axis current $I_{qv2}$ where the d-axis current $I_d$ is equal to the predetermined maximum value. The first voltage-limit-based q-axis current has a negative value and is not shown on the graph.

FIG. 5D illustrates a case in which there are no positive values of the q-axis current $I_q$ that are less than or equal to the q-axis current $I_q$ value of each of the plots 362, 364 for any d-axis current $I_d$ value. Thus, in this case, the voltage and motor current-based torque block 312 may set the voltage and motor current-based torque limit $T_{VltgMotCurr}$ equal to zero (0). In other words, the final torque limit $T_{pk}$ may be set to zero in cases where there is no direct relationship between the two curves represented by the plots 362, 364.

Figure 6:
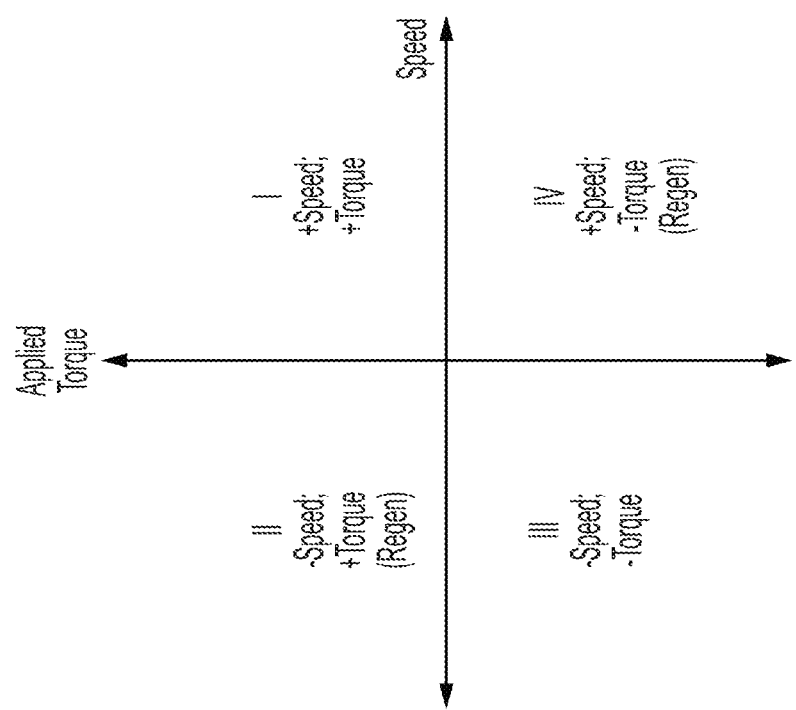
FIG. 6 generally illustrates a graph of applied torque vs. speed of a motor control system according to aspects of the present disclosure.

FIG. 6 depicts a graph of applied torque vs. speed of a motor control system according to aspects of the present disclosure. Specifically, FIG. 6 depicts the graph including four quadrants, with quadrants II and IV each associated with the motor control system being in a regenerative mode.

Figure 7:
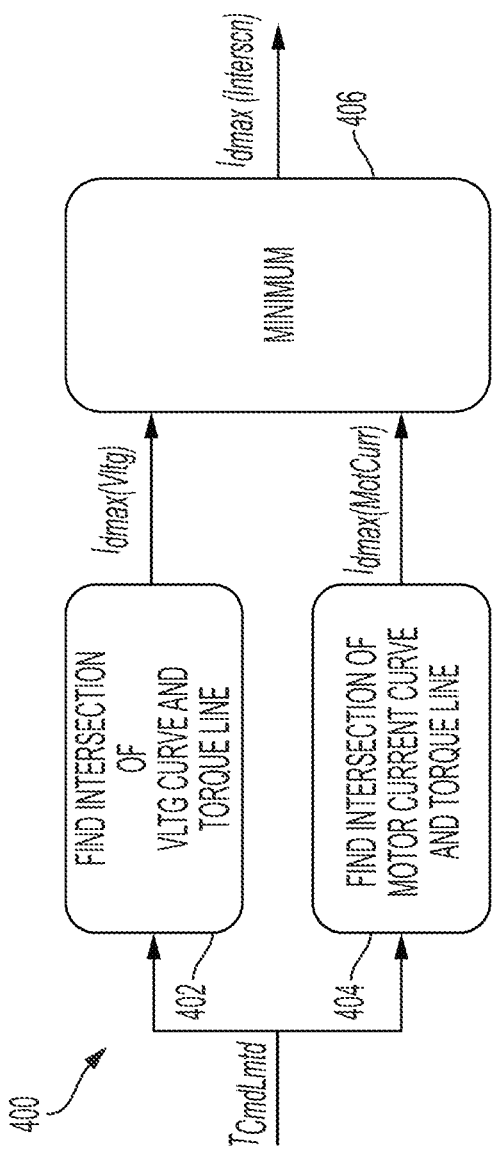
FIG. 7 generally illustrates a block diagram of a regenerative search control algorithm according to the principles of the present disclosure.

FIG. 7 generally illustrates a block diagram of a regenerative current search algorithm 400, which may be implemented in the regen. maximum d-axis current search block 321 according to the principles of the present disclosure.

The regenerative current search algorithm 400 includes a voltage and torque intersection block 402, which is configured to determine a voltage-based maximum d-axis current $I_{dmax(Vltg)}$ using the limited command torque $T_{CmdLmtd}$. The voltage and torque intersection block 402 may determine the voltage-based maximum d-axis current $I_{dmax}(Vltg)$ that corresponds to the limited command torque $T_{CmdLmtd}$ at given motor speeds based on known voltage characteristics of the motor 19 (e.g., the PMSM). The voltage and torque intersection block 402 may calculate the voltage-based maximum d-axis current $I_{dmax}(Vltg)$ directly using a formula or other numeric method. The voltage and torque intersection block 402 may determine the voltage-based maximum d-axis current $I_{dmax}(Vltg)$ using other methods, such as using a lookup table, an estimation method and/or using iterative modeling. As described below with reference to FIG. 9, the voltage and torque intersection block 402 may determine the voltage-based maximum d-axis current $I_{dmax}$ (Vltg) based on an intersection of a constant torque line corresponding to the limited command torque $T_{CmdLmtd}$, and a set of d-axis and q-axis current values corresponding to the motor satisfying the motor voltage constraint. The constant torque line corresponding to the limited command torque $T_{CmdLmtd}$ is shown in the third plot 434 of FIG. 9, and the d-axis and q-axis current values corresponding to the inverter 216 satisfying the voltage constraint $V_{DC}$ of the DC bus 215 are represented in the second plot 432 of FIG. 9.

The regenerative current search algorithm 400 also includes a motor current and torque intersection block 404, which is configured to determine a motor-current based maximum d-axis current $I_{dmax}(MotCurr)$ using the limited command torque $T_{CmdLmtd}$. The motor current and torque intersection block 404 may determine the motor current-based maximum d-axis current $I_{dmax}(MotCurr)$ that corresponds to the limited command torque $T_{CmdLmtd}$ at given motor speeds based on known characteristics of the motor 19 (e.g., the PMSM). The motor current and torque intersection block 404 may calculate the motor current-based maximum d-axis current $I_{dmax}(MotCurr)$ directly using a formula or other numeric method. The motor current and torque intersection block 404 may determine the motor current-based maximum d-axis current $I_{dmax}(MotCurr)$ using other methods, such as using a lookup table, an estimation method and/or using iterative modeling. As described below with reference to FIG. 9, the motor current and torque intersection block 404 may determine the motor-current based maximum d-axis current $I_{dmax}(MotCurr)$ based on an intersection of a constant torque line corresponding to the limited command torque $T_{CmdLmtd}$ and a set of d-axis and q-axis current values corresponding to the motor satisfying the motor current constraint.

The regenerative current search algorithm 400 also includes a comparison block 406 that compares the voltage-based maximum d-axis current $I_{dmax}(Vltg)$ from the voltage and torque intersection block 402 against the motor current-based maximum d-axis current $I_{dmax}(MotCurr)$ from the motor current and torque intersection block 404 in order to determine a maximum d-axis current intersection $I_{dmax(Interscn)}$ value that is the lesser of the voltage-based maximum d-axis current $I_{dmax}(Vltg)$ and the motor current-based maximum d-axis current $I_{dmax}(MotCurr)$.

Figure 8:
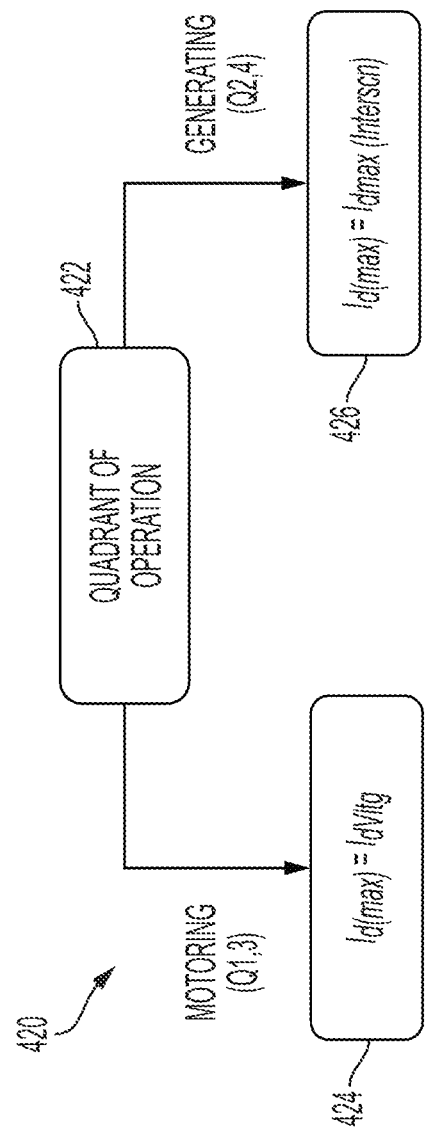
FIG. 8 generally illustrates a block diagram of an algorithm for adjusting maximum d-axis current based on quadrant of operation according to the principles of the present disclosure.

FIG. 8 generally illustrates a block diagram of an algorithm 420 for adjusting the maximum d-axis current $I_{dmax}$ based on quadrant of operation according to the principles of the present disclosure. The maximum d-axis current $I_{dmax}$ may also be written as $I_{d(max)}$. The algorithm 420 of FIG. 8 includes a quadrant determination block 422 that determines the current quadrant of operation of the motor 19 (e.g., the PMSM). See FIG. 6, discussed above, for details regarding the four quadrants of operation.

The algorithm 420 of FIG. 8 also includes a motoring control block 424 that is configured to set the maximum d-axis current $I_{dmax}$ equal to the voltage-based maximum d-axis current $I_{dmax}(Vltg)$ in response to the quadrant determination block 422 determining that the motor 19 (e.g., the PMSM) is operating in one of quadrants 1 or 3 (I or III), indicating that the motor is operating in a mechanical power producing mode, which may also be called "motoring".

The algorithm 420 of FIG. 8 also includes a generating control block 426 that is configured to set the maximum d-axis current $I_{dmax}$ equal to the maximum d-axis current intersection $I_{dmax(Interscn)}$ in response to the quadrant determination block 422 determining that the motor 19 (e.g., the PMSM) is operating in one of quadrants 2 or 4 (II or IV), indicating that the motor is operating in a mechanical power reducing mode, which may also be called "generating".

Figure 9:
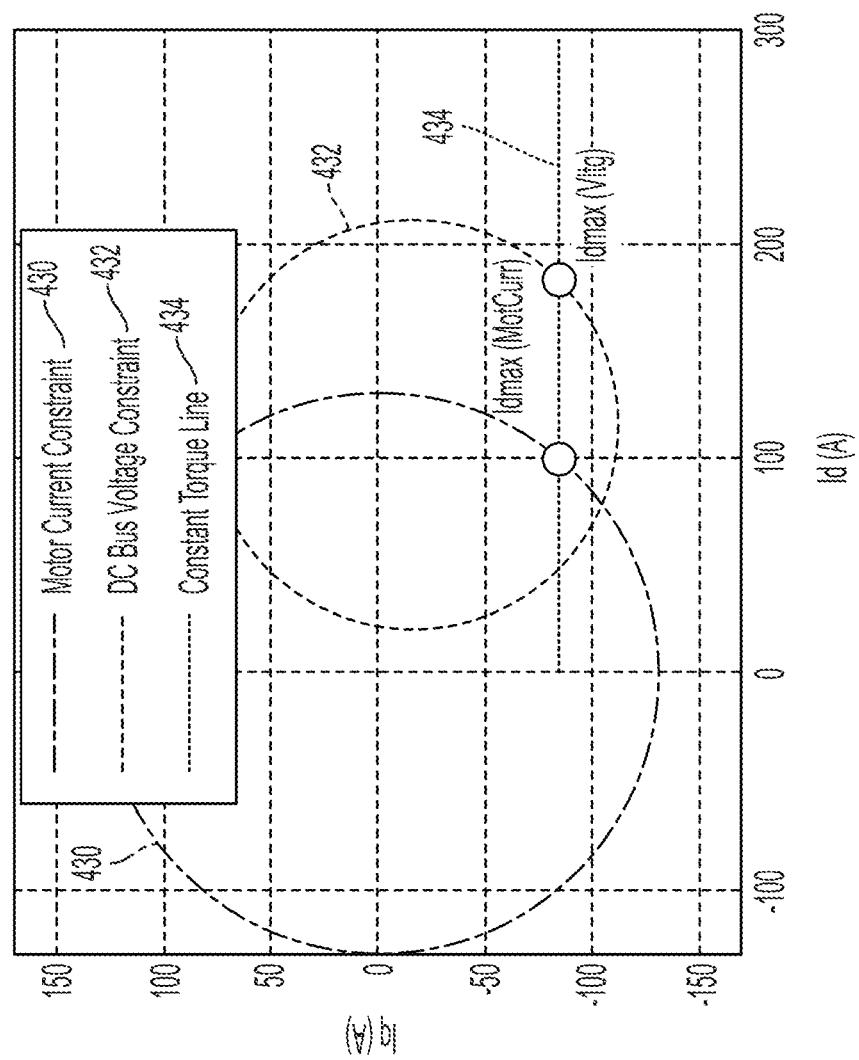
FIG. 9 shows a graph generally illustrating principles of a regenerative search control algorithm according to the principles of the present disclosure.

FIG. 9 shows a graph generally illustrating principles of a regenerative search control algorithm according to the principles of the present disclosure. The graph of FIG. 9 includes plots of q-axis current $I_q$ (in amps, A) vs. d-axis current $I_d$ (in amps, A). Specifically, the graph of FIG. 9 shows a first plot 430 of the motor current constraint, which are combinations of d-axis current and q-axis current that correspond to the motor current limit $I_i^{lim}$. FIG. 9 also shows a second plot 432 of the motor voltage constraint, which are combinations of d-axis current and q-axis current that, when supplied to the motor, cause the inverter 216 to satisfy the voltage constraint $V_{DC}$ of the DC bus 215. FIG. 9 also shows a third plot 434 of a constant torque line, which may represent the limited command torque $T_{CmdLmtd}$. The intersection between the first plot 430 of the motor current constraint and the third plot 434 of the constant torque line represents the motor current-based maximum d-axis current $I_{dmax(MotCurr)}$ on the x-axis (representing d-axis current $I_d$). Similarly, the intersection between the second plot 432 of the motor voltage constraint and the third plot 434 of the constant torque line represents the voltage-based maximum d-axis current $I_{dmax(Vltg)}$ on the x-axis (representing d-axis current $I_d$).

The system and method of the present disclosure may consider all constraints simultaneously and prioritize torque maximization over regenerative current.

Figure 10:
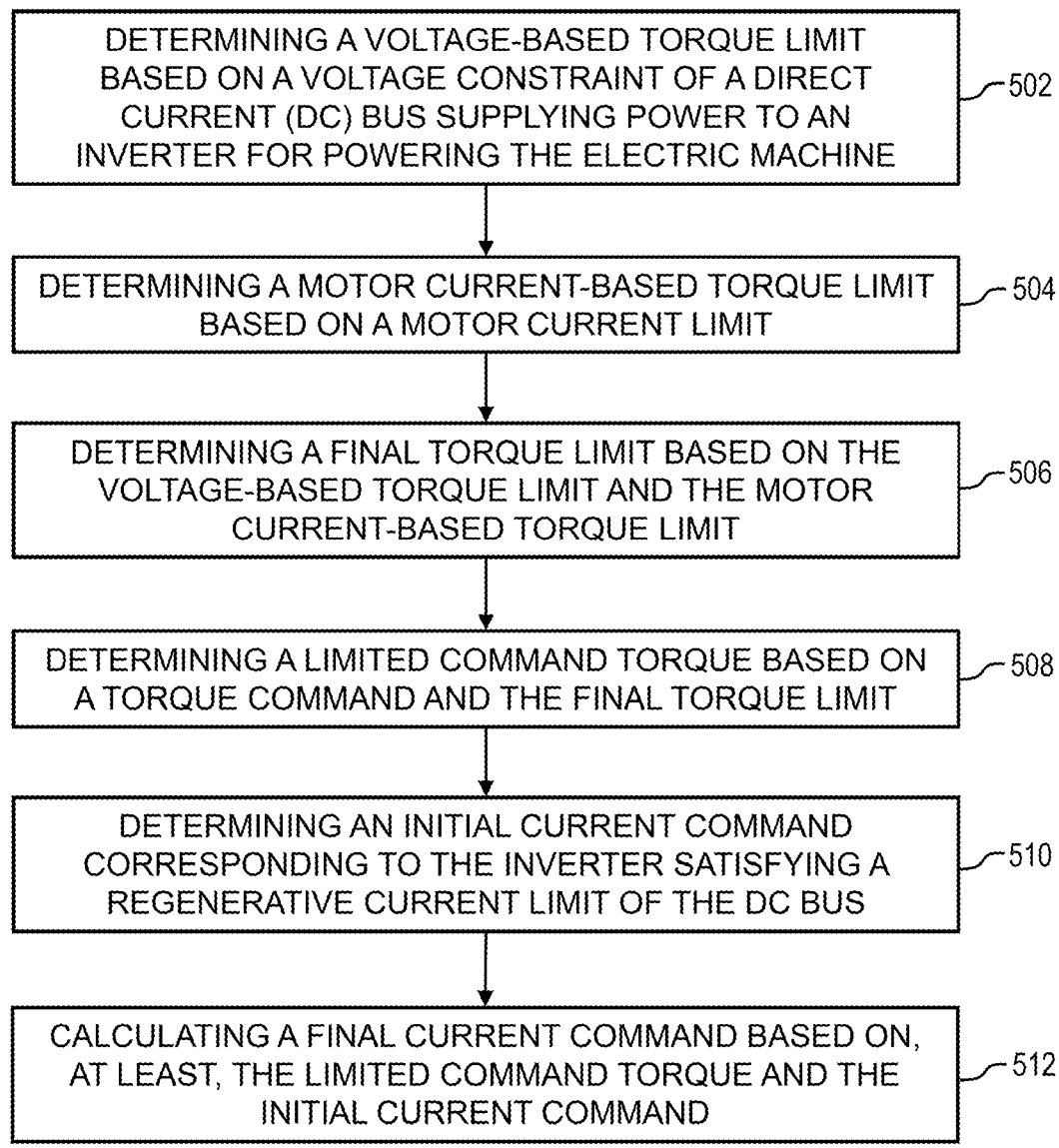
FIG. 10 shows a flow diagram generally illustrating a method of controlling operation of an electric machine, according to principles of the present disclosure.

FIG. 10 shows a flow diagram generally illustrating a method 500 of controlling operation of an electric machine. The method 500 prioritizes achieving the torque command over meeting the regenerative current limit of the DC bus 215. At 502, the method 500 determines a voltage-based torque limit based on a voltage constraint of a direct current (DC) bus supplying power to an inverter for powering the electric machine. For example, the processor may execute instructions implementing the voltage-based torque block 304 to determine the voltage-based torque limit $T_{Vltg}$.

At 504, the method 500 determines a motor current-based torque limit based on a motor current limit. For example, the processor 60 may execute instructions implementing the motor current-based torque block 306 to determine the motor current-based torque limit $T_{MotCurr}$ corresponding to the motor current $I_m$ supplied by the inverter 216 to the motor 19 satisfying a motor current limit $I_i^{lim}$.

At 506, the method 500 determines a final torque limit based on the voltage-based torque limit and the motor current-based torque limit. For example, the processor 60 may execute instructions implementing the torque arbitration block 302 to determine final torque limit as the arbitrated torque limit $T_{Arb}$.

At 508, the method 500 determines a limited command torque based on a torque command and the final torque limit. For example, the processor 60 may execute instructions implementing the torque limiting block 320 to determine the limited command torque $T_{CmdLmtd}$ based on a commanded torque $T_c$ and the arbitrated torque limit $T_{Arb}$. More specifically, the torque limiting block 320 may set the limited command torque $T_{CmdLmtd}$ as the commanded torque $T_c$, limited not to exceed the arbitrated torque limit $T_{Arb}$.

At 510, the method 500 determines an initial current command corresponding to the inverter satisfying a regenerative current limit of the DC bus. For example, the processor 60 may execute instructions implementing the regen. current search block 326, to determine the initial current command, which include, for example, the modified d-axis current $I''_d$ and the modified q-axis current $I''_q$, which, together, correspond to the inverter 216 satisfying the regenerative current limit $I_{Regen}$ of the DC bus 215.

At 512, the method 500 calculates a final current command based on, at least, the limited command torque and the initial current command. For example, the processor 60 may execute instructions implementing the maximum torque per voltage block 328 to determine the d-axis current command $I_{dCmd}$ and the q-axis current command $I_{qCmd}$ to cause the motor 19 to produce a maximum torque which also satisfies the limited command torque $T_{CmdLmtd}$. Thus, the system and method may prioritize torque maximization over meeting the regenerative current constraint. This may be useful or necessary in safety-critical applications, such as in an EPS system, where meeting a peak torque demand, especially for a short period of time, may provide advantages that outweigh the potential issues that may result from the inverter supplying a regenerative current to the DC bus that exceeds the regenerative current limit of the DC bus. Such issues may include, for example, battery degradation. Potential issues caused by exceeding the regenerative current limit of the DC bus may be mitigated by the operating characteristics of the system, which may include only exceeding the regenerative current limit of the DC bus for short periods of time and/or exceeding the regenerative current limit of the DC bus only in rare circumstances that are unlikely to happen during normal operation.

A method of controlling operation of an electric machine includes: determining a voltage-based torque limit based on a voltage constraint of a direct current (DC) bus supplying power to an inverter for powering the electric machine; determining a motor current-based torque limit based on a motor current limit; determining a final torque limit based on the voltage-based torque limit and the motor current-based torque limit; determining a limited command torque based on a torque command and the final torque limit; determining an initial current command corresponding to the inverter satisfying a regenerative current limit of the DC bus; and calculating a final current command based on, at least, the limited command torque and the initial current command, the final current command exceeding the initial current command to cause the electric machine to produce a torque corresponding to the limited torque command.

In some embodiments, the method of controlling operation of an electric machine further includes selectively controlling a plurality of switches within the inverter to cause the inverter to supply a current to the electric machine based on the final current command.

In some embodiments, the motor current limit includes a current limit of the inverter.

In some embodiments, the method of controlling operation of an electric machine further includes calculating a supply current-based torque limit based on a supply current limit that the DC bus is rated to supply to the inverter; and determining the final torque limit further includes determining the final torque limit based on the supply current-based torque limit.

In some embodiments, determining the final torque limit includes arbitrating between the voltage-based torque limit and the motor current-based torque limit.

In some embodiments, arbitrating between the voltage-based torque limit and the motor current-based torque limit further includes: determining a first motor current-based q-axis current corresponding to a d-axis current having a predetermined minimum value and corresponding to the motor current limit; determining a second motor current-based q-axis current corresponding to the d-axis current having a predetermined maximum value and corresponding to the motor current limit; determining a first voltage limit-based q-axis current corresponding to a d-axis current having a predetermined minimum value and corresponding to the voltage constraint of the DC bus; determining a second voltage limit-based q-axis current corresponding to the d-axis current having a predetermined maximum value and corresponding to the voltage constraint of the DC bus; determining one of the first motor current-based q-axis current and the first voltage limit-based q-axis current having a lesser value; determining one of the second motor current-based q-axis current and the second voltage limit-based q-axis current having a lesser value; and selecting one of the motor current-based torque limit and the voltage-based torque limit based on the one of the first motor current-based q-axis current and the first voltage limit-based q-axis current having the lesser value and based on the one of the second motor current-based q-axis current and the second voltage limit-based q-axis current having the lesser value.

In some embodiments, selecting the one of the motor current-based torque limit and the voltage-based torque limit further comprises: selecting the motor current-based torque limit as the final torque limit in response to determining the first motor current-based q-axis current being less than the first voltage limit-based q-axis current, and the second motor current-based q-axis current being less than the second voltage limit-based q-axis current; and selecting the voltage-based torque limit as the final torque limit in response to determining the first voltage limit-based q-axis current being less than the first motor current-based q-axis current, and the second voltage limit-based q-axis current being less than the second motor current-based q-axis current.

In some embodiments, arbitrating between the voltage-based torque limit and the motor current-based torque limit further comprises: determining a first motor current-based q-axis current corresponding to a d-axis current having a predetermined minimum value and corresponding to the motor current limit; determining a second motor current-based q-axis current corresponding to the d-axis current having a predetermined maximum value and corresponding to the motor current limit; determining a first voltage limit-based q-axis current corresponding to a d-axis current having a predetermined minimum value and corresponding to the voltage constraint of the DC bus; determining a second voltage limit-based q-axis current corresponding to the d-axis current having a predetermined maximum value and corresponding to the voltage constraint of the DC bus; determining one of the first motor current-based q-axis current and the first voltage limit-based q-axis current having a lesser value; determining one of the second motor current-based q-axis current and the second voltage limit-based q-axis current having a lesser value; determining the one of the second motor current-based q-axis current and the second voltage limit-based q-axis current having the lesser value corresponding to a different constraint from the one of the first motor current-based q-axis current and the first voltage limit-based q-axis current having the lesser value; determining a d-axis intersection current value where a q-axis current corresponding to the motor current limit is equal to a q-axis current corresponding to the voltage constraint of the DC bus; and determining the final torque limit based on the d-axis intersection current value and based on the q-axis current corresponding to each of motor current limit and the voltage constraint of the DC bus.

A control system for controlling operation of an electric machine includes a processor and a memory that includes instructions. When executed by the processor, the instructions cause the processor to: determine a voltage-based torque limit based on a voltage constraint of a direct current (DC) bus supplying power to an inverter for powering the electric machine; determine a motor current-based torque limit based on a motor current limit; determine a final torque limit based on the voltage-based torque limit and the motor current-based torque limit determine a limited command torque based on a torque command and the final torque limit; calculate an initial current command corresponding to the inverter satisfying a regenerative current limit of the DC bus; and calculate a final current command based on, at least, the limited command torque and the initial current command, the final current command exceeding the initial current command to cause the electric machine to produce a torque corresponding to the limited torque command.

In some embodiments, the instructions further cause the processor to selectively control a plurality of switches within the inverter to cause the inverter to supply a current to the electric machine based on the final current command.

In some embodiments, the motor current limit includes a current limit of the inverter.

In some embodiments, the instructions further cause the processor to calculate a supply current-based torque limit based on a supply current limit that the DC bus is rated to supply to the inverter; and determining the final torque limit further includes the processor determining the final torque limit based on the supply current-based torque limit.

In some embodiments, determining the final torque limit comprises the processor arbitrating between the voltage-based torque limit and the motor current-based torque limit.

In some embodiments, arbitrating between the voltage-based torque limit and the motor current-based torque limit further includes the instructions causing the processor to: determine a first motor current-based q-axis current corresponding to a d-axis current having a predetermined minimum value and corresponding to the motor current limit; determine a second motor current-based q-axis current corresponding to the d-axis current having a predetermined maximum value and corresponding to the motor current limit; determine a first voltage limit-based q-axis current corresponding to a d-axis current having a predetermined minimum value and corresponding to the voltage constraint of the DC bus; determine a second voltage limit-based q-axis current corresponding to the d-axis current having a predetermined maximum value and corresponding to the voltage constraint of the DC bus; determine one of the first motor current-based q-axis current and the first voltage limit-based q-axis current having a lesser value; determine one of the second motor current-based q-axis current and the second voltage limit-based q-axis current having a lesser value; and select one of the motor current-based torque limit and the voltage-based torque limit based on the one of the first motor current-based q-axis current and the first voltage limit-based q-axis current having the lesser value and based on the one of the second motor current-based q-axis current and the second voltage limit-based q-axis current having the lesser value.

In some embodiments, selecting the one of the motor current-based torque limit and the voltage-based torque limit further comprises the instructions causing the processor to: select the motor current-based torque limit as the final torque limit in response to determining the first motor current-based q-axis current being less than the first voltage limit-based q-axis current, and the second motor current-based q-axis current being less than the second voltage limit-based q-axis current; and select the voltage-based torque limit as the final torque limit in response to determining the first voltage limit-based q-axis current being less than the first motor current-based q-axis current, and the second voltage limit-based q-axis current being less than the second motor current-based q-axis current.

In some embodiments, arbitrating between the voltage-based torque limit and the motor current-based torque limit further comprises the instructions causing the processor to: determine a first motor current-based q-axis current corresponding to a d-axis current having a predetermined minimum value and corresponding to the motor current limit; determine a second motor current-based q-axis current corresponding to the d-axis current having a predetermined maximum value and corresponding to the motor current limit; determine a first voltage limit-based q-axis current corresponding to a d-axis current having a predetermined minimum value and corresponding to the voltage constraint of the DC bus; determine a second voltage limit-based q-axis current corresponding to the d-axis current having a predetermined maximum value and corresponding to the voltage constraint of the DC bus; determine one of the first motor current-based q-axis current and the first voltage limit-based q-axis current having a lesser value; determine one of the second motor current-based q-axis current and the second voltage limit-based q-axis current having a lesser value; determine the one of the second motor current-based q-axis current and the second voltage limit-based q-axis current having the lesser value corresponding to a different constraint from the one of the first motor current-based q-axis current and the first voltage limit-based q-axis current having the lesser value; determine a d-axis intersection current value where a q-axis current corresponding to the motor current limit is equal to a q-axis current corresponding to the voltage constraint of the DC bus; and determine the final torque limit based on the d-axis intersection current value and based on the q-axis current corresponding to each of motor current limit and the voltage constraint of the DC bus.

A control system for controlling operation of an electric machine includes an inverter and a controller. The inverter includes a plurality of switches operable to supply an alternating current to the electric machine. The controller is operable to: determine a voltage-based torque limit based on a voltage constraint of a direct current (DC) bus supplying power to an inverter for powering the electric machine; determine a motor current-based torque limit based on a motor current limit; determine a final torque limit based on the voltage-based torque limit and the motor current-based torque limit; determine a limited command torque based on a torque command and the final torque limit; determine an initial current command corresponding to the inverter satisfying a regenerative current limit of the DC bus; and calculate a final current command based on, at least, the limited command torque and the initial current command, the final current command exceeding the initial current command to cause the electric machine to produce a torque corresponding to the limited torque command.

In some embodiments, the motor current limit includes a current limit of the inverter.

In some embodiments, the controller is further operable to calculate a supply current-based torque limit based on a supply current limit that the DC bus is rated to supply to the inverter; and determining the final torque limit further includes the controller determining the final torque limit based on the supply current-based torque limit.

In some embodiments, determining the final torque limit comprises the controller arbitrating between the voltage-based torque limit and the motor current-based torque limit.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A method of controlling operation of an electric machine, comprising:
    determining a voltage-based torque limit based on a voltage constraint of a direct current (DC) bus supplying power to an inverter for powering the electric machine;
    determining a motor current-based torque limit based on a motor current limit;
    determining a final torque limit based on the voltage-based torque limit and the motor current-based torque limit;
    determining a limited command torque based on a torque command and the final torque limit;
    determining an initial current command corresponding to the inverter satisfying a regenerative current limit of the DC bus; and
    calculating a final current command based on, at least, the limited command torque and the initial current command, the final current command exceeding the initial current command to cause the electric machine to produce a torque corresponding to the limited torque command.

2. The method of claim 1, further comprising selectively controlling a plurality of switches within the inverter to cause the inverter to supply a current to the electric machine based on the final current command.

3. The method of claim 1, wherein the motor current limit includes a current limit of the inverter.

4. The method of claim 1, further comprising calculating a supply current-based torque limit based on a supply current limit that the DC bus is rated to supply to the inverter; and
    wherein determining the final torque limit further includes determining the final torque limit based on the supply current-based torque limit.

5. The method of claim 1, wherein determining the final torque limit comprises arbitrating between the voltage-based torque limit and the motor current-based torque limit.

6. The method of claim 5, wherein arbitrating between the voltage-based torque limit and the motor current-based torque limit further comprises:
    determining a first motor current-based q-axis current corresponding to a d-axis current having a predetermined minimum value and corresponding to the motor current limit;
    determining a second motor current-based q-axis current corresponding to the d-axis current having a predetermined maximum value and corresponding to the motor current limit;
    determining a first voltage limit-based q-axis current corresponding to a d-axis current having a predetermined minimum value and corresponding to the voltage constraint of the DC bus;
    determining a second voltage limit-based q-axis current corresponding to the d-axis current having a predetermined maximum value and corresponding to the voltage constraint of the DC bus;
    determining one of the first motor current-based q-axis current and the first voltage limit-based q-axis current having a lesser value;
    determining one of the second motor current-based q-axis current and the second voltage limit-based q-axis current having a lesser value; and
    selecting one of the motor current-based torque limit and the voltage-based torque limit based on the one of the first motor current-based q-axis current and the first voltage limit-based q-axis current having the lesser value and based on the one of the second motor current-based q-axis current and the second voltage limit-based q-axis current having the lesser value.

7. The method of claim 6, wherein selecting the one of the motor current-based torque limit and the voltage-based torque limit further comprises:
    selecting the motor current-based torque limit as the final torque limit in response to determining the first motor current-based q-axis current being less than the first voltage limit-based q-axis current, and the second motor current-based q-axis current being less than the second voltage limit-based q-axis current; and
    selecting the voltage-based torque limit as the final torque limit in response to determining the first voltage limit-based q-axis current being less than the first motor current-based q-axis current, and the second voltage limit-based q-axis current being less than the second motor current-based q-axis current.

8. The method of claim 5, wherein arbitrating between the voltage-based torque limit and the motor current-based torque limit further comprises:
    determining a first motor current-based q-axis current corresponding to a d-axis current having a predetermined minimum value and corresponding to the motor current limit;

determining a second motor current-based q-axis current corresponding to the d-axis current having a predetermined maximum value and corresponding to the motor current limit;

determining a first voltage limit-based q-axis current corresponding to a d-axis current having a predetermined minimum value and corresponding to the voltage constraint of the DC bus;

determining a second voltage limit-based q-axis current corresponding to the d-axis current having a predetermined maximum value and corresponding to the voltage constraint of the DC bus;

determining one of the first motor current-based q-axis current and the first voltage limit-based q-axis current having a lesser value;

determining one of the second motor current-based q-axis current and the second voltage limit-based q-axis current having a lesser value;

determining the one of the second motor current-based q-axis current and the second voltage limit-based q-axis current having the lesser value corresponding to a different constraint from the one of the first motor current-based q-axis current and the first voltage limit-based q-axis current having the lesser value;

determining a d-axis intersection current value where a q-axis current corresponding to the motor current limit is equal to a q-axis current corresponding to the voltage constraint of the DC bus; and determining the final torque limit based on the d-axis intersection current value and based on the q-axis current corresponding to each of motor current limit and the voltage constraint of the DC bus.

9. A control system for controlling operation of an electric machine, comprising:
a processor; and
a memory that includes instructions that, when executed by the processor, cause the processor to:
determine a voltage-based torque limit based on a voltage constraint of a direct current (DC) bus supplying power to an inverter for powering the electric machine;
determine a motor current-based torque limit based on a motor current limit;
determine a final torque limit based on the voltage-based torque limit and the motor current-based torque limit;
determine a limited command torque based on a torque command and the final torque limit;
calculate an initial current command corresponding to the inverter satisfying a regenerative current limit of the DC bus; and
calculate a final current command based on, at least, the limited command torque and the initial current command, the final current command exceeding the initial current command to cause the electric machine to produce a torque corresponding to the limited torque command.

10. The control system of claim 9, wherein the instructions further cause the processor to selectively control a plurality of switches within the inverter to cause the inverter to supply a current to the electric machine based on the final current command.

11. The control system of claim 9, wherein the motor current limit includes a current limit of the inverter.

12. The control system of claim 9, wherein the instructions further cause the processor to calculate a supply current-based torque limit based on a supply current limit that the DC bus is rated to supply to the inverter; and
wherein determining the final torque limit further includes the processor determining the final torque limit based on the supply current-based torque limit.

13. The control system of claim 9, wherein determining the final torque limit comprises the processor arbitrating between the voltage-based torque limit and the motor current-based torque limit.

14. The control system of claim 13, wherein arbitrating between the voltage-based torque limit and the motor current-based torque limit further includes the instructions causing the processor to:
determine a first motor current-based q-axis current corresponding to a d-axis current having a predetermined minimum value and corresponding to the motor current limit;
determine a second motor current-based q-axis current corresponding to the d-axis current having a predetermined maximum value and corresponding to the motor current limit;
determine a first voltage limit-based q-axis current corresponding to a d-axis current having a predetermined minimum value and corresponding to the voltage constraint of the DC bus;
determine a second voltage limit-based q-axis current corresponding to the d-axis current having a predetermined maximum value and corresponding to the voltage constraint of the DC bus;
determine one of the first motor current-based q-axis current and the first voltage limit-based q-axis current having a lesser value;
determine one of the second motor current-based q-axis current and the second voltage limit-based q-axis current having a lesser value; and
select one of the motor current-based torque limit and the voltage-based torque limit based on the one of the first motor current-based q-axis current and the first voltage limit-based q-axis current having the lesser value and based on the one of the second motor current-based q-axis current and the second voltage limit-based q-axis current having the lesser value.

15. The control system of claim 14, wherein selecting the one of the motor current-based torque limit and the voltage-based torque limit further comprises the instructions causing the processor to:
select the motor current-based torque limit as the final torque limit in response to determining the first motor current-based q-axis current being less than the first voltage limit-based q-axis current, and the second motor current-based q-axis current being less than the second voltage limit-based q-axis current; and
select the voltage-based torque limit as the final torque limit in response to determining the first voltage limit-based q-axis current being less than the first motor current-based q-axis current, and the second voltage limit-based q-axis current being less than the second motor current-based q-axis current.

16. The control system of claim 13, wherein arbitrating between the voltage-based torque limit and the motor current-based torque limit further comprises the instructions causing the processor to:
determine a first motor current-based q-axis current corresponding to a d-axis current having a predetermined minimum value and corresponding to the motor current limit;

determine a second motor current-based q-axis current corresponding to the d-axis current having a predetermined maximum value and corresponding to the motor current limit;

determine a first voltage limit-based q-axis current corresponding to a d-axis current having a predetermined minimum value and corresponding to the voltage constraint of the DC bus;

determine a second voltage limit-based q-axis current corresponding to the d-axis current having a predetermined maximum value and corresponding to the voltage constraint of the DC bus;

determine one of the first motor current-based q-axis current and the first voltage limit-based q-axis current having a lesser value;

determine one of the second motor current-based q-axis current and the second voltage limit-based q-axis current having a lesser value;

determine the one of the second motor current-based q-axis current and the second voltage limit-based q-axis current having the lesser value corresponding to a different constraint from the one of the first motor current-based q-axis current and the first voltage limit-based q-axis current having the lesser value;

determine a d-axis intersection current value where a q-axis current corresponding to the motor current limit is equal to a q-axis current corresponding to the voltage constraint of the DC bus; and determine the final torque limit based on the d-axis intersection current value and based on the q-axis current corresponding to each of motor current limit and the voltage constraint of the DC bus.

17. A control system for controlling operation of an electric machine, comprising:

an inverter including a plurality of switches operable to supply an alternating current to the electric machine; and a controller operable to:

determine a voltage-based torque limit based on a voltage constraint of a direct current (DC) bus supplying power to an inverter for powering the electric machine;

determine a motor current-based torque limit based on a motor current limit;

determine a final torque limit based on the voltage-based torque limit and the motor current-based torque limit;

determine a limited command torque based on a torque command and the final torque limit;

determine an initial current command corresponding to the inverter satisfying a regenerative current limit of the DC bus; and calculate a final current command based on, at least, the limited command torque and the initial current command, the final current command exceeding the initial current command to cause the electric machine to produce a torque corresponding to the limited torque command.

18. The control system of claim 17, wherein the motor current limit includes a current limit of the inverter.

19. The control system of claim 17, wherein the controller is further operable to calculate a supply current-based torque limit based on a supply current limit that the DC bus is rated to supply to the inverter; and wherein determining the final torque limit further includes the controller determining the final torque limit based on the supply current-based torque limit.

20. The control system of claim 17, wherein determining the final torque limit comprises the controller arbitrating between the voltage-based torque limit and the motor current-based torque limit.

* * * * *